Jan. 15, 1952  A. M. BERGMANN  2,582,410
SLIT MECHANISM
Filed May 3, 1949

INVENTOR.
ANDREW M. BERGMANN
BY
ATTORNEYS

Patented Jan. 15, 1952

2,582,410

UNITED STATES PATENT OFFICE 2,582,410

SLIT MECHANISM

Andrew M. Bergmann, Cheektowaga, N. Y., assignor to American Optical Company, Southbridge, Mass., a voluntary association of Massachusetts Application May 3, 1949, Serial No. 91,180

7 Claims. (Cl. 88—61)

This invention relates to adjustable slit mechanisms for use in spectroscopic, ophthalmic and other instruments having need for accurately formed parallel-sided slits which may be readily adjusted to various desired sizes throughout a predetermined range.

While many slit mechanisms have already been provided for such instruments and some of these mechanisms have appeared to be of relatively simple construction, the work of providing a highly accurate parallel-sided slit, particularly at very narrow slit openings, has been difficult and time-consuming. As a result the cost of making such mechanisms has been considerable. Furthermore, some of these slit mechanisms of earlier constructions have failed to retain their original accuracy after they had been used considerably.

It is accordingly an object of the present invention to provide a slit mechanism which is of simple construction, inexpensive to manufacture, easy to assemble and highly accurate at all slit openings throughout its normal range of adjustment. It is also an object of the present invention to provide in such a slit mechanism a construction and arrangement in which wear and like conditions resulting from extended use of the mechanism will not destroy the original accurate adjustment thereof.

Other objects and advantages of the invention will become apparent from the detailed description which follows when taken in conjunction with the accompanying drawing in which.

It will be apparent, when considering any slit mechanism, that as the slit thereof is decreased in width any departure from a true parallel condition of the adjacent edges forming the slit becomes more noticeable and objectionable the smaller the slit becomes. For example, if the slit-forming edges are only five one hundred thousandths of an inch from a true parallel condition when the slit is adjusted to an opening of substantially fifty one hundred thousandths, this non-parallel condition may not be readily noticeable or objectionable. However, if the slit mechanism is readjusted to an opening of only ten one hundred thousandths, and the same error of five one hundred thousandths is still present, this error will be most apparent since the slit at such times will be twice as wide at one end thereof as it is at the opposite end thereof. For such reasons, it is not only desirable that slit mechanisms be easily adjusted into accurate parallelism but also desirable, should any wear later occur in the parts from extended use of the mechanism, that such accuracy should not be lost. Such an improved slit mechanism will now be described.

Figure 1:
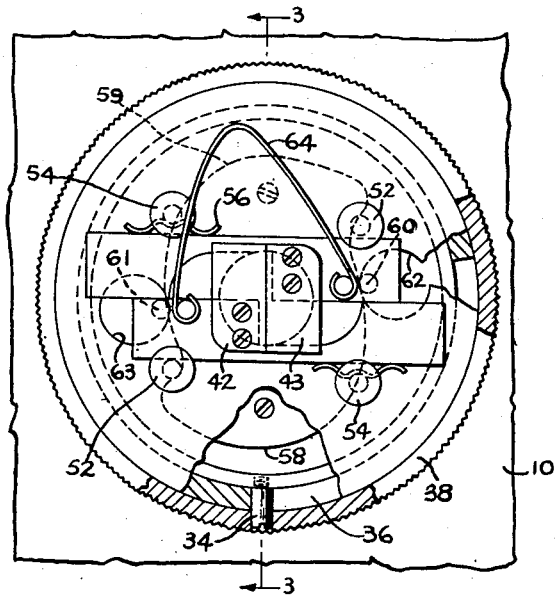
Fig. 1 is a plan view of a preferred embodiment of a slit mechanism embodying the present invention, certain parts of the mechanism being broken away to better show details of construction.
Figure 2:
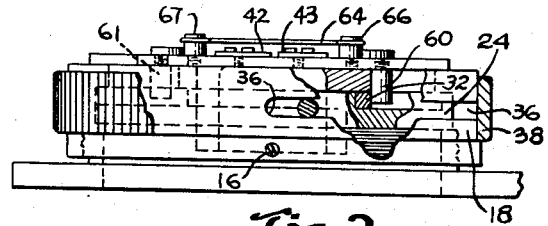
Fig. 2 is a front elevational view of the mechanism of Fig. 1 but having certain parts thereof broken away in order to disclose other details thereof.
Figure 3:
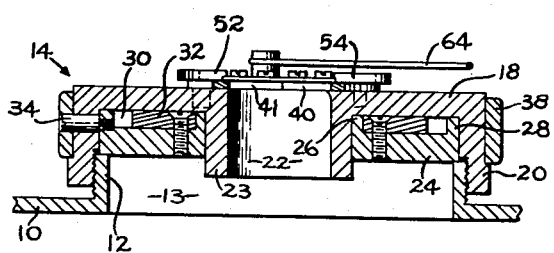
Fig. 3 is a vertical sectional view taken substantially on line 3—3 of Fig. 1 and looking in the direction of the arrows.

In Figs. 1, 2 and 3, the numeral 10 indicates any suitable base upon which may be provided an upstanding threaded projecting collar 12 surrounding a large opening 13 and upon this collar may be threaded a supporting member 14. The supporting member may be locked upon the collar when adjusted to its proper operative position by means of a set screw or the like 16. The supporting member 14 has a main horizontal body portion 18 and a circular flanged portion 20 upon the lower inner surface of which is carried the threads for engagement with the collar 12. A smaller central opening or passageway 22 is formed by a downwardly projecting circular flange 23 in this horizontal body portion 18 and through this passageway 22 may pass the beam of light which is to be controlled in width by the slit mechanism as will be presently described.

A rotatable apertured disc 24 positioned beneath the body portion 18 and surrounding circular flange 23 is provided with concentric circular inner and outer edges and these edges are provided, as best seen in Fig. 3, with upwardly projecting flanges 26 and 28 so that an annular recess 30 is formed between flanges 26 and 28 for receiving an actuating cam 32. The cam may be bolted or otherwise fixedly secured to the disc 24 and rotated thereby. A short pin 34 is secured in the outer edge of the disc 24 and extends outwardly through a slot 36 formed in the flanged portion 20 of the supporting member 14 and the end of this pin extends into an opening formed in an outer knurled actuating ring 38 surrounding the supporting member 14.

Thus when this knurled ring is rotated through an angular amount, for example, in Fig. 1 as much as approximately 90°, it will cause pin 34 to rotate disc 24 and cam 32. The supporting member 14 is threaded onto the projecting collar 12 just far enough to have the upper edge of the collar 12 and horizontal portion 18 closely confine the rotatable disc 24 before member 14 is locked in place by set screw 16.

Upon the upper surface of the support 14 and arranged to extend across the upper end of the central passageway 22 are a pair of relatively wide and flat elongated bar-like members or carriers 40 and 41 upon the upper surfaces, respectively, of which are secured in a manner which will be presently described a pair of flat slit-forming elements or plates 42 and 43. These bar-like members are provided with flat rectilinear sliding surfaces 44 and 45, respectively (see Fig. 4), and a central portion of each bar-like member is cut-away as indicated at 46 and 47 so as not to obstruct light passing between the elements 42 and 43 and through the opening 22 in any operative position of adjustment of the mechanism. Adjacent the cut-away portions on the bar-like members are right-angular shoulder portions 48 and 49 to which may be secured as by means of adjustable screws or the like 50 the slit-forming elements 42 and 43. These slit-forming elements or plates are disposed in side-by-side relation and will have their adjacent accurately formed straight inner edges 42' and 43' positioned to provide therebetween a parallel-sided slit. The parallelism of these elements may be easily effected by merely providing in one or both of the elements holes for receiving the securing screws 50 of slightly larger size than the size of the screws themselves and then, while bars 40 and 41 have their adjacent edges 44 and 45 pressed into firm mutual engagement, one slit-forming element may be firmly secured in place after which the edges 42' and 43' may be pressed into firm mutual engagement and held while the other screws 50 for the other element are tightened. Obviously, thereafter if one bar-like member 40 or 41 and the slit-forming element thereon are moved relative to the other bar-like member and element thereon while surfaces 44 and 45 are maintained in sliding contact, a parallel-sided slit will be at all times provided.

In order to assure that such sliding contact is firmly maintained between edges 44 and 45 the mechanism is provided with a pair of diametrically spaced fixed guiding pins 52 which are secured in the horizontal body portion 18 of the support 14. Flanged portions on these pins 52 overlie the outer elongated edges of the bar-like members 40 and 41. A second pair of diametrically spaced fixed guiding pins 54 are secured in the horizontal body portion 18 of the support 14 and flanged portion thereof are also arranged to overlie the outer edges, respectively, of the elongated bar-like members 40 and 41. These guide pins 54 have their shank portions spaced slightly from said outer edges of members 40 and 41 so that resilient spring 56 may be accommodated therebetween for constantly urging opposite ends of the bars 40 and 41, respectively, toward the opposing pins 52, thus maintaining the inner surfaces 44 and 45 in sliding engagement with each other at all times.

The actuating cam 32 is provided with a pair of outwardly facing cam surfaces 58 and 59 which are arranged to engage pins 60 and 61 secured respectively to the lower sides of the bars 40 and 41 and extending downwardly through small openings 62 and 63 in the body portion 18. Thus when ring 38 is rotated counter-clockwise to actuate cam 32 and cause it to pivot about the central flange 23 of the supporting member 14, pins 60 and 61 will be pressed outwardly. A U-shaped spring 64 has its opposite ends in engagement with a second pair of pins 66 and 67 extending upwardly from bars 40 and 41 and this U-shaped spring continuously tends to urge these bars and slit-forming elements 42 and 43 carried thereby toward a central slit-closing position.

It should be appreciated that the adjacent slit-forming edges 42' and 43' upon the elements 42 and 43 may be accurately formed as a well matched pair by a simple honing operation in known manner by merely rubbing these elements together. Likewise, the adjacent guiding surfaces 44 and 45 of the bars 40 and 41 may be readily honed into complementary relationship. When the surfaces 44 and 45 have been so formed any additional wear therebetween such as might result during repeated use of the mechanism will have no bad effect upon the accurate parallel relationship of the slit-forming edges 42' and 43'.

Since both slit-forming elements may be clamped in place while parts 40 and 41 are pressed together and while parts 42 and 43 are also pressed together, the adjustment thereof into exact parallelism is no problem. It is not necessary either that the edges 42' and 43' be exactly at right angles to the direction of the surfaces 44 and 45. An approximate 90° relationship therebetween is satisfactory. Thus, in the slit mechanism of the present invention not only is a structure which is of relatively inexpensive construction provided but also this structure may be easily and rapidly adjusted into accurate relationship to form a parallel-sided slit. Furthermore, this mechanism will thereafter maintain its accuracy over long periods of use.

Figure 4:
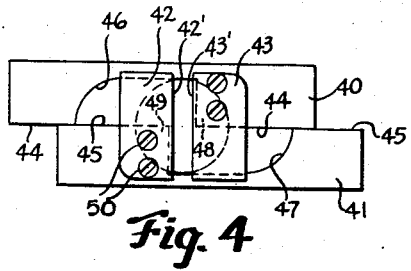
Fig. 4 is a plan view showing the slit-forming elements of the mechanism of Fig. 1 but with these elements in a different position of adjustment.
Figure 5:
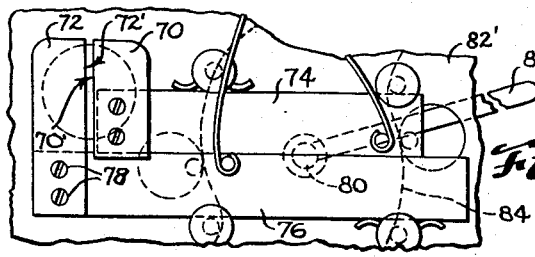
Fig. 5 is a plan view showing a modified form of the invention.

In Fig. 5, a slightly modified construction embodying the invention is shown wherein the slit-forming elements 70 and 72 are disposed near one end of the bar-like members or carriers 74 and 76, instead of intermediate the ends as shown by Figs. 1 and 4. In this latter construction, it will be noted that it will not be necessary to recess members 74 and 76 for the passage of the light beam. However, the accurate parallelism of the slit-forming edges 70' and 72' by the use of screws 78 may be readily obtained in the same manner as described in the earlier, preferred construction. In Fig. 5, the only other material change resides in the provision of a pivot pin 80 carried by the main support 82 and about which the cam 84 may be rotated when actuated by a hand lever 86. This construction of Fig. 5 might be preferred at times in cases where space is not as limited as in the arrangement of Fig. 1. Nevertheless in both modifications, inexpensive structures are provided and the slits thereof may be very easily and rapidly adjusted into the parallel condition desired. Furthermore, in the construction of Fig. 1 by having the guide pins 52 for the bar-like members 40 and 41 diametrically disposed and the guide pins 54 and the associated springs 56 likewise diametrically disposed the center of the slit, for any size opening, may be constantly maintained at a substantially fixed point. This might be important at times when an optical system is being used with the slit mechanism and same requires that the slit be at all times axially aligned with the optical axis of this system.

I claim:

1. A slit mechanism comprising a support, a pair of flat, elongated members carried in side-by-side relation by said support and having complementary guiding surfaces formed upon adjacent side portions thereof, means continuously resiliently urging at least one of said members toward the other of said members for maintaining contact between said guiding surfaces for all positions of adjustment thereof, a pair of slit-forming elements carried by said members, respectively, and having slit-forming edges disposed upon adjacent portions thereof, said edges being disposed generally angularly relative to the plane of said guiding surfaces, means adjustably securing said slit-forming elements to said elongated members with said slit-forming edges in substantially exact parallel relation to each other, means for moving one of said elongated members and the slit-forming element carried thereby relative to the other of said elongated members and its slit-forming element in a direction paralleling said guiding surfaces for effecting a parallel-sided slit of desired width between said edges, and resilient means connected to said elongated member and arranged to act in opposition to said means for moving one of said elongated members for effecting movement thereof in the opposite direction.

2. A slit mechanism comprising a support, a pair of flat, elongated members carried in side-by-side relation by said support and having complementary guiding surfaces formed upon adjacent side portions thereof, means continuously resiliently urging said members toward each other for maintaining contact between said guiding surfaces for all positions of adjustment thereof, a pair of slit-forming elements carried by said members, respectively, and having complementary slit-forming edges disposed upon adjacent portions thereof, said edges being disposed generally angularly relative to said guiding surfaces, means adjustably receiving and securely clamping said slit-forming elements to said elongated members while the slit-forming edges thereof are maintained in parallel relation to each other, manually operable means for moving one of said elongated members and the slit-forming element carried thereby in a first direction paralleling said guiding surfaces and relative to the other of said elongated members and its slit-forming element for altering the size of said slit, and resilient means connected to said elongated members and arranged to act in opposition to said manually operable means for effecting movement in the opposite direction.

3. A slit mechanism comprising a support having a light aperture formed therein, a pair of flat elongated bar-like members carried in side-by-side relation thereby and having contacting complementary guiding surfaces upon adjacent side portions thereof, guide means carried by said support at substantially equidistantly spaced diametrically opposed locations relative to said aperture and engaging the outer sides of said members, resilient means also carried by said support at substantially equidistantly spaced diametrically opposed locations relative to said aperture and engaging the outer sides of said members at points spaced from said guide means so as to urge the opposite ends of said members toward each other for maintaining contact between said complementary guiding surfaces for all operative positions thereof, a pair of slit-forming elements carried by said elongated members, respectively, and having complementary slit-forming edges upon adjacent portions thereof, said edges being disposed in angular relation with reference to said complementary guiding surfaces and arranged to extend across said aperture when in engagement, releasable means adjustably securing one of said slit-forming elements to its bar-like supporting member while its slit-forming edge is maintained in substantially exact parallel relation to the slit-forming edge on the other element, means for simultaneously moving said bar-like members and the slit-forming elements carried thereby in opposite directions paralleling said guiding surfaces for effecting a parallel-sided slit of desired width between said edges, and resilient means connected to said bar-like members and arranged to act in opposition to said means for moving said bar-like members for effecting movement thereof in the opposite direction.

4. A slit mechanism comprising a support having a light aperture formed therein, a pair of flat elongated bar-like members carried in side-by-side relation thereby and having complementary guiding surfaces formed upon adjacent side portions thereof, guide means carried by said support at substantially equidistantly spaced diametrically opposed locations relative to said aperture and engaging the outer sides of said members, resilient means also carried by said support at substantially equidistantly spaced diametrically opposed locations to said aperture and engaging the outer sides of said members at points spaced from said guide means so as to urge the opposite ends of said members toward each other for maintaining contact between said complementary guiding surfaces, a pair of slit-forming elements carried by said elongated members, respectively, and having complementary slit-forming edges upon adjacent portions thereof, said edges being disposed in angular relation with reference to said complementary guiding surfaces and arranged to extend across said aperture, releasable means for securing one of said slit-forming elements to its elongated supporting member while its slit-forming edge is maintained in substantially exact parallel relation to the slit-forming edge of the other element, means for simultaneously moving said bar-like members and the slit-forming elements carried thereby equal amounts in opposite directions for effecting a parallel-sided slit of desired width between said edges while maintaining the center of said slit in a fixed predetermined position.

5. A slit mechanism comprising a support having a light aperture formed therein, a cylindrical flange surrounding said aperture, a pair of flat elongated bar-like members carried in side-by-side relation thereby and having complementary guiding surfaces formed upon adjacent side portions thereof, means on said support for urging said members toward each other for maintaining contact between said complementary guiding surfaces, a pair of plate-like elements carried by said elongated members, respectively, and having slit-forming edges upon adjacent portions thereof, said edges being disposed in angular relation with reference to said complementary guiding surfaces and arranged to extend across said aperture, releasable means for securing one of said plate-like elements to its elongated supporting member while its slit-forming edge is maintained in substantially exact parallel relation to the slit-forming edge of the other element, means for moving said elongated members relative to each other for effecting a parallel-sided slit of desired width between said plate-like elements, said means comprising a rotatable cam surrounding said cylindrical flange and having operative engagement with parts carried by said elongated members for urging said members in opposite directions, and spring means arranged to act in opposition to said cam for urging said elongated members in the opposite direction.

6. A slit mechanism comprising a support having a light aperture formed therein, a cylindrical flange surrounding said aperture, a pair of flat elongated bar-like members carried in side-by-side relation thereby and having complementary guiding surfaces formed upon adjacent side portions thereof, guide means carried by said support at substantially equidistantly spaced diametrically opposed locations relative to said aperture and engaging the outer sides of said members, resilient means also carried by said support at substantially equidistantly spaced diametrically opposed locations to said aperture and engaging the outer sides of said members at points spaced from said guide means so as to urge the opposite ends of said members toward each other for maintaining contact between said complementary guiding surfaces, a pair of plate-like elements carried by said elongated members, respectively, and having complementary slit-forming edges upon adjacent portions thereof, said edges being disposed in angular relation with reference to said complementary guiding surfaces and arranged to extend across said aperture, releasable means for securing one of said slit-forming elements to its elongated supporting member while its slit-forming edge is maintained in substantially exact parallel relation to the slit-forming edge of the other element, means for simultaneously moving said elongated members relative to each other for effecting a parallel-sided slit of desired width between said plate-like elements, the means comprising a rotatable cam surrounding said cylindrical flange and having operative engagement with parts carried by said elongated members for urging said members in opposite directions, and spring means arranged to act in opposition to said cam means for urging said elongated members in the opposite direction.

7. A slit mechanism comprising a support, a first guide member carried by said support and having an elongated guiding surface formed thereon, a first slit-forming element having a slit-forming edge angularly disposed relative to the elongated guiding surface of said guide member, a second guide member carried by said support and having an elongated guiding surface formed thereon, a second slit-forming element carried by said second guide member and having a slit-forming edge adjacent said first slit-forming edge and angularly disposed relative to the elongated guiding surface on said second guide member, means constantly resiliently urging one of said members toward the other of said members for maintaining contacting engagement of said elongated guiding surfaces for all positions of adjustment thereof, means adjustably securing one of said slit-forming elements in operative position with its slit-forming edge in exact parallel relation to the slit-forming edge of the other element, and readily operable means for moving one of said elongated members and the slit-forming element associated therewith relative to the other slit-forming element and in a direction paralleling said elongated guiding surfaces for effecting a parallel-sided slit of desired width.

ANDREW M. BERGMANN.

REFERENCES CITED

The following references are of record in the file of this patent:

UNITED STATES PATENTS

| Number | Name | Date |
|---|---|---|
| 272,117 | Boydston | Feb. 13, 1883 |
| 1,024,242 | Atherton | Apr. 23, 1912 |
| 1,207,271 | Brown | Dec. 5, 1916 |
| 1,742,600 | Kliegl et al. | Jan. 7, 1930 |
| 2,094,214 | Heymer | Sept. 28, 1937 |
| 2,408,512 | Gradisar | Oct. 1, 1946 |

FOREIGN PATENTS

| Number | Country | Date |
|---|---|---|
| 395,920 | Great Britain | July 27, 1933 |